United States Patent Office.

LUDWIG SELL, OF PASING-MÜNCHEN, GERMANY, ASSIGNOR TO APOTHEKER LUDWIG SELL & CO., OF SAME PLACE.

SALICIN COMPOUND AND PROCESS OF MAKING SAME.

SPECIFICATION forming part of Letters Patent No. 581,833, dated May 4, 1897.

Application filed July 20, 1896. Serial No. 599,941. (No specimens.)

*To all whom it may concern:*

Be it known that I, LUDWIG SELL, pharmacist, a citizen of Germany, residing at Pasing-München, Bavaria, Germany, have invented certain new and useful Improvements in Pharmacal Compounds and Methods of Preparing Same; and I do hereby declare the following to be a full, clear, and exact description of the invention, such as will enable others skilled in the art to which it appertains to make and use the same.

This invention relates to the preparation of a stable or durable mixture of salicin, saligenin, glucose, and free hydrochloric acid; and it consists in the method, features, and the article, all as hereinafter set forth, and pointed out in the claims.

The process involving my invention is distinguished principally by the fact that under it a partial splitting up of salicin by means of hydrochloric acid is carried out in an extract, whereby a stable dry mixture consisting of extractive matter, salicin, saligenin, glucose, and free hydrochlric acid, is obtained, which retains uniformly its original composition even when stored away for a long period of time.

In carrying out the process under my invention I preferably proceed as follows: A fluid extract is first prepared from the fruit of the horse-chestnut (*Æsculus hippocastanum*) by first roasting these fruits and then crushing or comminuting them as finely as possible and boiling with enough water to form a paste-like or pulpy mass. This mass is extracted several times with dilute alcohol and the several extracts are collected, the alcohol removed therefrom, and the residue evaporated down to a thick extract. The extract so obtained is then dissolved in so much dilute alcohol, (spiritus dilutus,) previously treated with five per cent. glycerin, that the whole will correspond to the tenth part of the comminuted or powdered mass employed—that is to say, of the powdered horse-chestnuts. This solution is filtered after several days. The extract so obtained contains for one hundred parts dry substance—*i. e.*, the horse-chestnuts—0.6 parts of glucose or dextrose, as well as a considerable proportion of tannin. The extract is then treated with about five per cent. hydrochloric acid and digested for two hours at a temperature of from 75° to 90° centigrade, the water lost by evaporation being subsequently replaced by distilled water. The analysis of the substance so obtained for one hundred parts solid matter contains 0.079 parts free hydrochloric acid and 0.33 parts glucose or dextrose. The tannin is decomposed. This acidified extract, while still hot, is then mixed with salicin in equal proportions and the mixture heated in a boiling-water bath for about twenty minutes until a distinct reaction, indicating the presence of saligenin produced by the splitting up of salicin by the hydrochloric acid, occurs. To this mixture, while still hot, I then add double the quantity of salicin first added, then knead or thoroughly work together the entire mass, spread the same upon glass slabs, and allow it to remain in this condition at a temperature of 19° centigrade or thereabout. After the lapse of about twenty-four hours the final product is obtained in the form of an air-dried powder.

I consider it preferable in carrying out my invention to adhere to substantially the exact mixing proportions specified. It is preferable, moreover, that the salicin is only partially decomposed or split up in a fixed ratio and that the completed mass contains free hydrochloric acid and that the reducible substances—estimated for dextrose—are present in a certain ratio. It is also necessary, to accomplish the best results, to intimately mix the several ingredients, so that the formation of mold or fungus growths, which is apt to occur in ordinary mixtures as the result of a splitting up of the salicin, will be prevented.

The product resulting from the hereinbefore-described process consists in a mixture of extractive matter with salicin, saligenin, glucose, and free hydrochloric acid and is a stable dark-grayish-yellow powder which is almost completely soluble in water, while the usual mixture of these ingredients decomposes comparatively rapidly, has a slight yellow color, and is insoluble in water.

This compound is a valuable therapeutic agent and remedy for gout or arthritis.

I find that the proper way to administer the remedy is at the rate of from six to eight grams per day in individual doses of one gram each. In some cases it will also be efficient to administer the same from two to four times per day in doses of five-tenths of a gram each, continuing the same for about a week. The remedy has been given in the form of pills.

Having thus described my invention, what I claim, and desire to secure by Letters Patent of the United States, is—

1. The process which consists in subjecting salicin, incorporated in a vegetable extract, to the action of hydrochloric acid to split the same up into saligenin and glucose and then adding more salicin.

2. The process of making a medical compound which consists in subjecting a mixture of an extract of the fruit of the *Æsculus hippocastanum* and salicin to the action of hydrochloric acid until the salicin is partially split up into saligenin and glucose and some free acid remains and then adding more salicin, all in the proportions and at the temperatures, substantially as set forth.

3. A pharmacal compound which consists in vegetable extractive matter in combination with salicin, saligenin, glucose and free acid, substantially as stated.

4. A pharmacal compound which consists in an extract from the fruit of the *Æsculus hippocastanum* in combination with salicin, saligenin, glucose and free hydrochloric acid and which is a stable grayish-yellow powder freely soluble in water, substantially as stated.

In testimony whereof I affix my signature in presence of two witnesses.

LUDWIG SELL.

Witnesses:
A. M. CIRSUNLY,
CARL MAYER.